D. E. BROWN.
COMBINED SANITARY WATER FILTER, AERATOR, AND COOLER.
APPLICATION FILED APR. 28, 1915.
1,174,384. Patented Mar. 7, 1916.
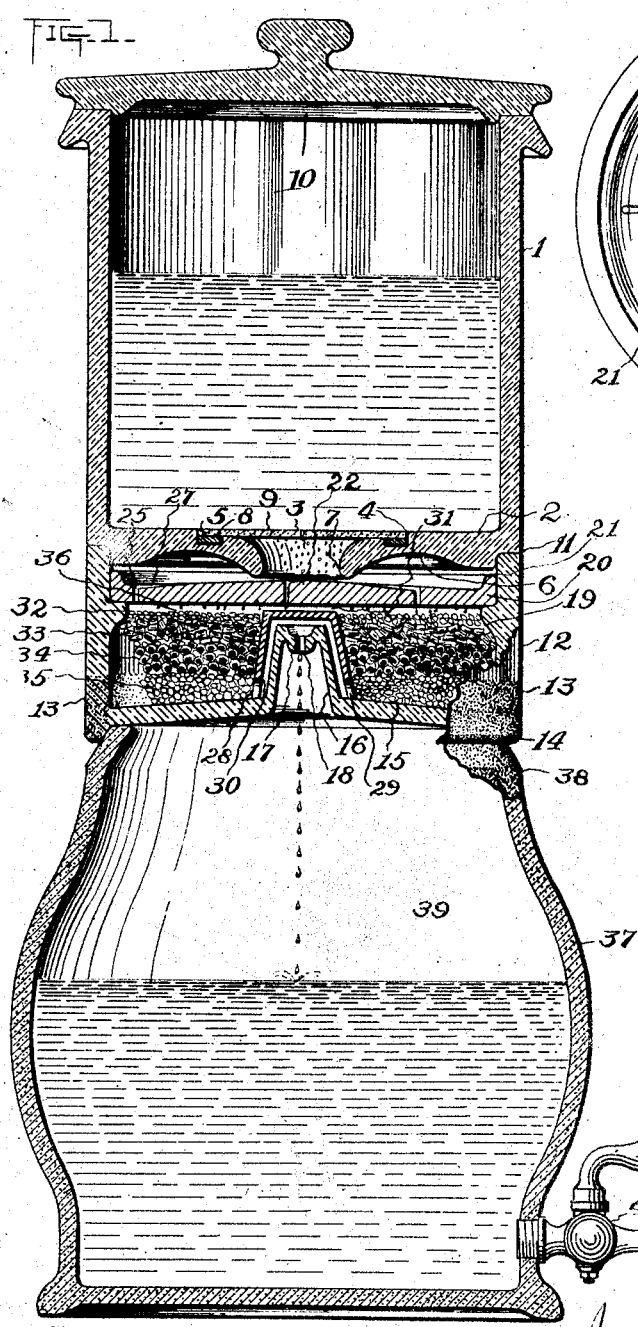
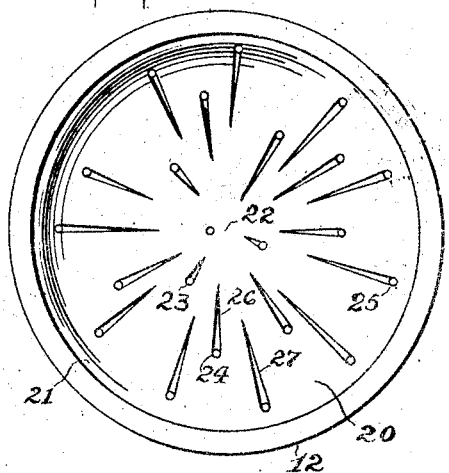
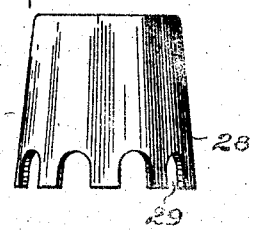
Witnesses:
F. M. Keeney
Estella Townsend
Inventor:
Derrell E. Brown
by James R. Townsend
his atty

UNITED STATES PATENT OFFICE.

DERRELL E. BROWN, OF OCEANPARK, CALIFORNIA.

COMBINED SANITARY WATER FILTER, AERATOR, AND COOLER.

1,174,384. Specification of Letters Patent. Patented Mar. 7, 1916.

Application filed April 28, 1915. Serial No. 24,600.

*To all whom it may concern:*

Be it known that I, DERRELL E. BROWN, a citizen of the United States, residing at Oceanpark, in the county of Los Angeles and State of California, have invented a new and useful Combined Sanitary Water Filter, Aerator, and Cooler, of which the following is a specification.

Objects of this invention are to provide a water filter and cooler which will in a superior manner separate the impurities from water and lodge the same in accessible places where they can be easily gotten at and removed with minimum disturbance of the filtering medium; to provide superior means for distributing water to the filtering medium in such manner as to secure superior percolation and to avoid the formation of channels through said medium; to provide a superior arrangement whereby the liquid to be filtered will be made to pass through the filtering material gently and without channel-forming tendencies; to provide against stagnancy of the liquid in the filtering material; to provide for aerating the water, and to provide for maintaining evaporation on the upper unfilled portion of the water-cooling chamber.

The invention may be carried out in various ways and I do not limit myself specifically to any peculiar shape or formation of the parts hereinafter described, it only being required that the principle of the invention hereinafter claimed be suitably embodied.

The invention includes various parts and combination of parts going to make up the complete appliance hereinafter set forth and claimed in the appended claims.

The accompanying drawings illustrate the invention in the form I at present deem most advisable.

Figure 1 is an elevation, mainly in axial section, showing a water filter, aerator and cooler constructed in accordance with this invention. At the middle of the view filtering material is omitted at the left to expose the inner face of the wall of the filter chamber, and at the right a portion of the outer face of said wall is shown to exemplify glazed and porous portions of said wall. Fig. 2 is a top plan of the filter chamber with distributing plate in place. Fig. 3 is a detached enlarged side elevation of the sluice-cap for the hollow dam.

The receiver, which is the receptacle into which the water to be filtered is placed, is constructed with a wall 1, preferably cylindrical, and an annular bottom 2 integral with the wall, and having a central opening 3 surrounded by a filter plate seat 4 and by a gasket seat in the form of a channel 5, the under-side of said bottom 2 being provided with an annular concavity 6 whereby the margin of the central opening 3 is in the form of a downwardly depending annular lip 7. A gasket 8 of asbestos or other suitable material is seated in the channel 5, and a permeable closure 9 that will serve as a filter medium, being in the instance shown, a porous stone plate, is tightly fitted in the filter plate seat 4; the plate being pressed down tightly upon the gasket 8 so as to practically form a water tight joint between the bottom 2 and the plate 9 to close the opening in the bottom of the receptacle so that water will ooze through said plate downward from the receptacle when charged with water to be filtered.

A cover 10 closes the top of the reservoir 1. At the periphery of the bottom 2 of the receiver an annular seat 11 is formed to fit on the top of the filter chamber comprising a wall formed with an upper glazed portion 12, a lower porous and unglazed portion 13 having a downwardly projecting chine 14, said porous portion being permeable to water and integral with and surrounding an impervious glazed floor 15 having at a central portion thereof a hollow dam 16 terminating at a considerable height above the top of the floor 15, in a depressed top 17 with centrally-arranged outlet 18 therein. Within said filter chamber is arranged a support 19 carrying a distributing plate 20. In the form shown the support 19 is an annular shoulder extending inwardly entirely around inside the filter chamber at a height above the glazed floor thereof, considerably greater than the height of the dam. Said plate is provided at its periphery with an upwardly extending bead 21, to the foot of which the top surface slopes gently from a central apex 22. The distributing plate is perforated at intervals as at 23, 24, 25 so that liquid falling onto the plate at or near the apex, and thence flowing down over the plate, will at intervals flow down through the perforations and drip from the mouths thereof. Some of said perforations are at the foot or junction of the cone and bead so that any liquid missing any of the holes will finally be collected by the bead and directed down through the holes at the foot thereof. Thus all the liquid falling on the plate will drain therefrom. Channels 26, 27 are provided in the top of the plate, each leading down the slope from a point somewhat below the apex to a perforation spaced considerably from the apex, the purpose being to insure the delivery of liquid in about equal proportions to the several holes, in consequence of which the liquid dripping down from the porous stone plate 9 onto the upper apex region of the conical distributing plate will be distributed over the cross-sectional area of the filter chamber and will drip down into said filter chamber from the margins of the several holes 23, 24, 25. Inside said filter chamber and resting on the glazed floor 15, a hollow cover is provided for the hollow dam, the same constituting a sluice cap 28 having an internal diameter greater than the external diameter of the hollow dam 16 and spaced apart from the dam all around the same to form a sluice-way. Ports 29 are provided around the foot of the sluice cap 28, there thus being a paspage from the filter chamber into the sluice-way to admit liquid to the sluice-way 30 between the sluice cap 28 and the hollow dam 16. The top of the sluice cap extends above and is spaced apart from the top of the hollow dam and is at a level somewhat below that of the seat for the distributing plate 20 and the plate support 19, so that there is an air space 31 between the under-side of the distributing plate and the top of the sluice cap.

Suitable filtering and water purifying material is provided in the filter chamber and by preference the same is arranged in layers as shown, comprising a top layer 32 of crushed crystal quartz; an upper layer 33 of crushed willow charcoal; a lower layer 34 of pulverized bone carbon, and a sub-layer 35 of crushed crystal quartz; the sub-layer extending sufficiently above the level of the ports 29 to prevent the bone carbon from entering the ports. The top layer 32 of crushed crystal quartz is for the purpose of holding down the willow charcoal and maintaining the surface of the same in an undisturbed condition. The surface of the top layer 32 is considerably below the distributing plate, thus providing an air space 36 in addition to and surrounding the air space 31 to aerate the water.

The filter chamber is mounted on an olla 37 or other suitable water cooling vessel, the same being permeable to moisture which may ooze therethrough from the contents of the cooler, the surface evaporation being depended upon to keep the interior of the cooler at a low temperature in order to increase the cooling effect. The upper portion of the water cooler 37 slopes outward and downward underneath the porous unglazed portions 13, 14 of the filter chamber, so that any liquid that may seep through and drip or flow down from said portions 13, 14 will fall onto the swell 38 at the top of the water cooler, thus moistening the upper portion of the water cooler so that evaporation will cool the empty upper portion of said water cooler chamber. An addition to this cooling effect is that upon the contents of the filter chamber resulting from the evaporation of the liquid from the lower portions 13, 14 of such chamber.

In practice, to assemble the parts the filter chamber, being fresh and clean inside, is first supplied with the sluice cap 28 and then the layers 35, 34, 33 and 32 are successively packed into place in the order named. Then the distributing plate 20 is put in place therefor and then the filter chamber thus completed is set in place on top of the water cooler. The receiver also being fresh and clean is supplied with a gasket 8 in the channel 4 and the porous stone plate filter 9 is then fitted into its seat and the receiver thus completed is placed on top of the filter chamber and is filled with water to be filtered. Then the cover 10 may be put in place and the filtering operation goes on as follows: The liquid passing down through the porous plate drips therefrom through the air space formed by the central opening 3 and falls upon the apex area of the distributing plate down which the liquid flows gently on the inclined surface toward the rim bead 21, portions of the liquid on its way falling through various holes through the distributing plate, portions being collected in the channels on the upper surface of the distributing plate and flowing down to the holes at the lower ends of such channels. In this way the liquid is widely distributed and drips from the under-face of the distributing plate down through the air space 36 on to the top layer in the filter chamber. The liquid moistens and finally permeates the layers of pulverized material in the filter chamber and flows through the ports 29 into, and gradually rises in, the sluice-way 30 between the sluice cap 28 and the dam 16 until the liquid reaches the top of the dam, over which it flows into the central depression in the top 17 and thence down through the outlet 18 whence it flows in drops through the air space 39 in the water cooler from which it may be drawn through the faucet 40. The liquid thus successively falls through the air space at 3 above the distributing plate, the air space 36 below the distributing plate and the air space 39 below the depressed top of the hollow dam. The liquid held by the dam submerges the charcoal and the filter material below the level of the top of the dam.

The filter chamber is mounted on the water cooler and the water receptacle is mounted upon the filter chamber in the usual manner of water filters and coolers of this type, so that there is sufficient passage for air to allow the liquid to pass into the water cooler and to allow liquid to flow freely therefrom when the faucet is open. The depressed top of the hollow dam serves to concentrate the liquid to the central opening in said top, thus to direct the liquid flowing over the dam centrally down through the air space in the water cooler, so that the liquid will drip through an air space of maximum depth.

Attention is directed to the cooling effect of the moistened upper air space inclosing walls of the water cooler, the tendency of which is to reduce the temperature of the air in the cooler, so that the drops of water falling from the top of the dam down through the air space will be initially cooled before reaching the main body of the liquid in the air cooler. Attention is also directed to the draining of liquid over the sloping glazed floor from the sluice-way and also from the filtering material to the outer wall and through the lower porous portion of such outer filter chamber walls, the result being that the water, which during the period of use submerges the filtering material, will be drained off within a few days after the supply of water has been cut off above the filter chamber. Thereby stagnation in the filter chamber is avoided. Particular attention is also directed to the bottom 2 of the water receptacle 1, said receptacle having an annular gasket seat 5 in the top of its floor and a depression 4 extending inwardly from the gasket seat and terminating in an annular rim or inside face of the lip 7, the same being around an unobstructed opening 3; and the porous stone plate 9 in said depression bridging over said unobstructed opening through which the liquid percolating through said plate may freely pass down onto the central part of the distributing plate 20. By this construction and arrangement the operation of cleaning the filter is greatly facilitated, for the reason that when the water has percolated over the receptacle 1 said receptacle can be perfectly cleaned by simply washing out the interior and thus removing the impurities intercepted by the porous stone plate, and by inverting the receptacle 1 access is given to enable the attendant to thoroughly clean the lip 7, if any impurities are found adhering thereto. At the same time the distributing plate 22 is bared to be cleaned by simply wiping off its surface. This work may be performed with any desired frequency with but little loss of time and with great convenience, and owing to the high water level maintained in the filter chamber by the dam there is but very little tendency of any sedimentary deposits passing down through the surface layer in said filter chamber, so that by removing the distributing plate at infrequent intervals the upper surface of the filtering material may be skimmed off and replaced with new, experience being depended upon to determine when the lower layers of the filtering material should be replaced. By reason of the unobstructed opening over the center of the distributing plate the impurities are deposited over a restricted area of the distributing plate, so that when the receptacle 1 is removed the attendant may by inspection readily determine to what extent impurities are being deposited from time to time and thus gain a fair idea as to when it is advisable to remove the distributing plate. It is to be noted that by the construction shown in this respect the greatest convenience is offered and the greatest inducement is given to the attendant to keep the filter clean, for the impurities in the bottom of the receptacle serve as a reminder that cleansing should be effected. These are always open to view when the cover 10 is removed from the receptacle, and naturally when the attendant has removed the receptacle for the purpose of washing out the sedimentary deposits therein the distributing plate is bared for inspection. Thus in large measure the filter is constituted to cause the attendant to keep it clean.

I claim:—

1. In a filter a water receptacle having an opening through its bottom; a porous closure closing said opening; a filter chamber below the water receptacle; a distributing plate supported in the filter chamber below said opening and provided with holes to distribute liquid falling on said distributing plate, said filter chamber having a hollow dam extending up thereinto and said dam having an opening at the top; a cap extending over said dam and forming a sluice-way between the dam and the sluice-cap, there being a passage from the filter chamber into said sluice-way and filter material between the passage and the level of the top of the dam.

2. In a filter a water receptacle having an opening through its bottom; a porous closure closing said opening; a filter chamber below the water receptacle; a distributing plate supported in the filter chamber below said opening and provided with holes to distribute liquid falling on said distributing plate, said filter chamber having a hollow dam extending up thereinto, said dam having an opening at the top; a cap extending over said dam and forming a sluice-way between the dam and the cap, there being a passage from the filter chamber to the bottom of the sluice-way; a water cooler below the filter chamber to receive liquid from the opening in the top of the dam and forming an air space through which the liquid passing from the dam may drip and thereby become aerated; and filter material between the passage and the level of the of top of the dam.

3. In a filter, a filter chamber provided at its upper portion with a glazed surface and having below such glazed surface a permeable portion through which liquid may seep from the lower part of the filter chamber, thus to drain liquid from the chamber.

4. In a filter, a filter chamber provided at its upper portion with a glazed surface and having below such glazed surface a permeable portion through which liquid may seep from the lower part of the filter chamber, thus to drain liquid from the chamber; and a water cooler below the filter chamber, said water cooler having a swell at its upper portion to receive the liquid passing through the porous portion of the filter chamber.

5. A filter chamber having a porous wall and provided with a floor that slopes from the central portion to the porous wall; a hollow dam at the central portion of the floor, said hollow dam terminating above the top of the floor and provided with an outlet therein, and a hollow cover for the hollow dam spaced apart from the dam to form a sluice-way, there being a passage from the filter chamber into the lower part of the sluice-way, and filtering material in the chamber between the level of the passage and the top of the dam, there being a drainage way formed by said sloping floor from the sluice-way to the porous wall.

6. A filter chamber; a distributing plate supported therein and arranged to distribute to the space below liquid falling on said distributing plate; said filter chamber having a hollow dam extending up thereinto and said dam having an opening at the top; a cap extending over said dam and forming a sluice-way between the dam and the sluice-cap, there being a passage from the filter chamber into the sluice-way; and filtering material in the filter chamber around said cap between the passage and the level of the top of the dam, there being an unobstructed air space above the cap and the distributing plate.

7. In a filter a filter chamber having a hollow dam extending up from its floor and provided with a depressed top and having a hole in said depression to direct liquid into the free air space formed by the hollow dam, there being filtering material in said filter chamber; and means to form a sluice-way communicating from said filtering material to the top of the dam, there being a passage to said sluice-way near the floor of the filter chamber, and an unobstructed air space through which liquid may drop onto the top of the filter material.

8. A filter chamber provided with an outlet above the floor of the chamber; means to direct liquid from the lower part of the filter chamber to said outlet; filter material between the inlet to said means and the level of the outlet; the outer wall of said filter chamber having a porous portion to drain off liquid from said filter chamber.

In testimony whereof, I have hereunto set my hand at Los Angeles, California, this 22d day of April, 1915.

DERRELL E. BROWN.

In presence of—
JAMES R. TOWNSEND,
ESTELLA TOWNSEND.